United States Patent [19]
De Doncker et al.

[11] Patent Number: 5,047,913
[45] Date of Patent: Sep. 10, 1991

[54] METHOD FOR CONTROLLING A POWER CONVERTER USING AN AUXILIARY RESONANT COMMUTATION CIRCUIT

[75] Inventors: Rik W. A. A. De Doncker; James P. F. Lyons, both of Niskayuna, N.Y.

[73] Assignee: General Electric Company, Schenectady, N.Y.

[21] Appl. No.: 583,910

[22] Filed: Sep. 17, 1990

[51] Int. Cl.$^5$ .......................................... H02M 7/521
[52] U.S. Cl. ...................................... 363/95; 363/96; 363/138
[58] Field of Search ...................... 363/95, 96, 98, 132, 363/136, 137, 138

[56] References Cited

U.S. PATENT DOCUMENTS

| | | | |
|---|---|---|---|
| 4,173,779 | 11/1979 | Abbondanti et al. | 363/135 |
| 4,255,783 | 3/1981 | Messer | 363/96 |
| 4,286,317 | 8/1981 | Kommissari | 363/136 |
| 4,334,265 | 6/1982 | Thorborg | 363/138 |
| 4,336,585 | 6/1982 | Moriarty | 363/136 |
| 4,730,242 | 3/1988 | Divan | 363/37 |
| 4,881,159 | 11/1989 | Holz et al. | 363/137 |

OTHER PUBLICATIONS

G. Bingen; "Utilisation De Transistors a Fort Courant Et Tension Elevee", 1st European Power Electronics Conference, Oct. 16–18, 1985, (Conference Record vol. 1).
W. J. McMurray, "Resonant Snubbers with Auxiliary Switches", Aug. 1989, IEEE-IAS Conference Proceedings, pp. 829–834.

Primary Examiner—William H. Beha, Jr.
Assistant Examiner—J. Sterrett
Attorney, Agent, or Firm—Jill M. Breedlove; James C. Davis, Jr.; Marvin Snyder

[57] ABSTRACT

A method for controlling a power converter and an associated auxiliary commutation circuit ensures soft-switching of all switching devices employed therein. Such a power converter includes an inverter with at least two main switching devices per phase. Across each main switching device are connected an antiparallel diode and a relatively large snubber capacitor. The auxiliary resonant commutation circuit comprises two antiparallel-coupled auxiliary switching devices coupled in series with a resonant circuit including an inductor and the snubber capacitors. The gating and conduction times of the main and auxiliary switching devices are controlled so as to add boosting energy to the resonant operation, thus ensuring that the inverter output voltage at least reaches the positive and negative inverter rail voltages during each resonant commutation cycle. As a result, the control achieves commutation of the converter pole with substantially no switching losses.

8 Claims, 12 Drawing Sheets

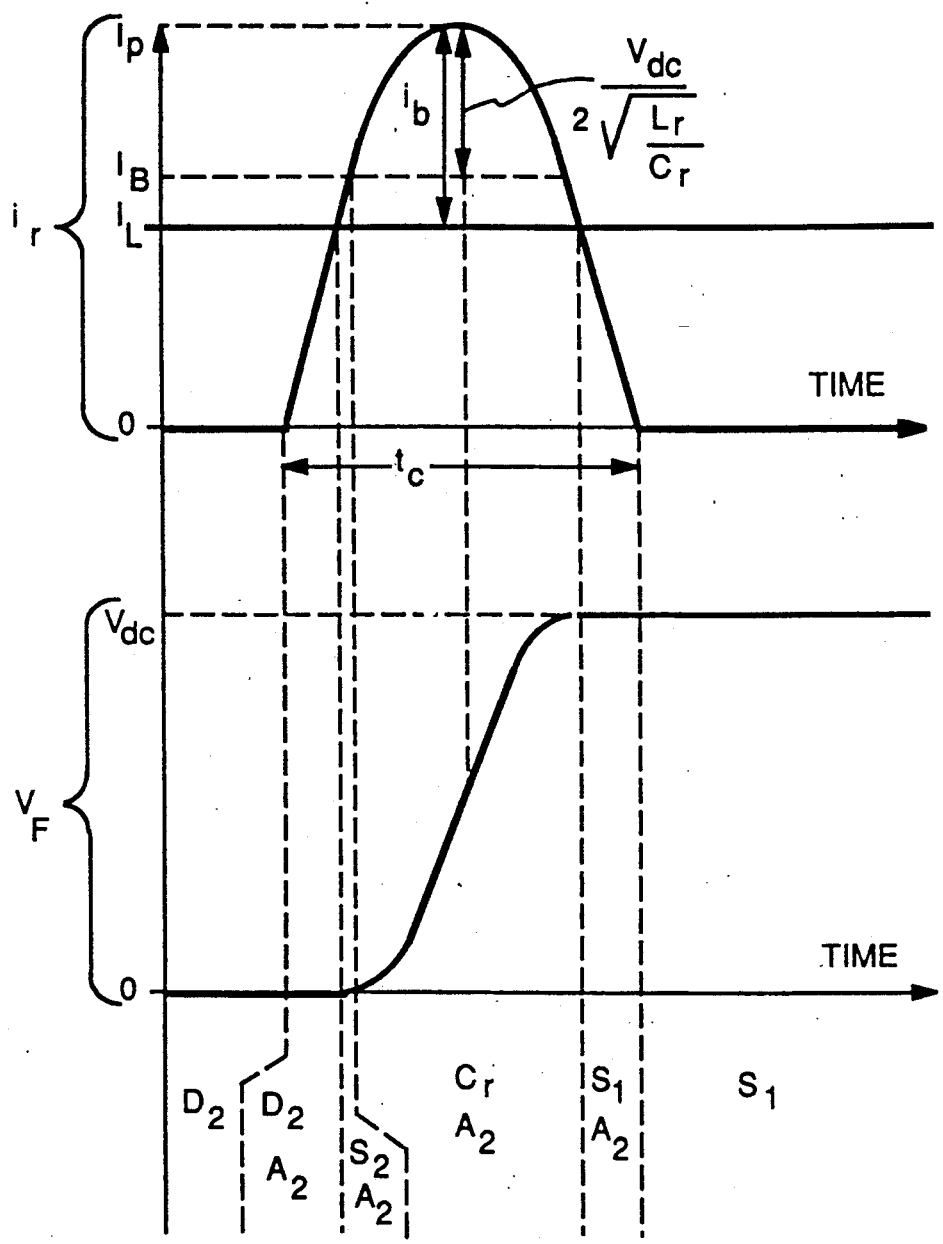

METHOD FOR CONTROLLING A POWER CONVERTER USING AN AUXILIARY RESONANT COMMUTATION CIRCUIT

This invention was made with Government support under contract N61533-89-C-0004 awarded by DARPA. The Government has certain rights in this invention.

FIELD OF THE INVENTION

The present invention relates generally to power converters. More particularly, the present invention relates to a method for controlling a resonant power converter by suitably controlling an auxiliary resonant commutation circuit to achieve soft-switching of the converter's switching devices.

BACKGROUND OF THE INVENTION

To overcome the problem of active device switching losses in power converters, while enabling operation at higher switching frequencies, soft-switching converters have been developed. In general, there are two types of soft-switching, or resonant, converters: zero-voltage switching and zero-current switching. Zero-voltage switching involves switching the active devices when there is zero voltage thereacross. Zero-current switching involves switching the active devices when there is zero current therethrough. Unfortunately, however, higher voltage or current stresses generally result from operation of such soft-switching power converters, necessitating the use of devices with higher voltage or current ratings, respectively.

Recently, an LC resonant snubber circuit triggered by auxiliary switching devices was proposed to minimize the high dynamic stresses encountered when turning on and off the main switching devices in an inverter. As described by W. J. McMurray in a paper entitled "Resonant Snubbers with Auxiliary Switches", 1989 IEEE-IAS Conference Proceedings, pp. 829–834, each of the main switching devices of an inverter having two devices per phase leg, or pole, is coupled in parallel with a sufficiently large capacitor to achieve substantially zero-voltage turn-off conditions. The control initially provides a turn-off signal to one of the main switching devices of an inverter pole, and subsequently triggers an auxiliary switching device to provide a temporary path to take over the high-stress, turn-on duty from the other main switching device of the inverter pole in a manner that leaves no energy trapped after switching. In particular, the LC resonant circuit ideally swings the output voltage from one power rail to the other, at which time the opposite main switching device is turned on. Advantageously, this resonant snubber circuit topology does not impose any voltage or current penalties on the main devices. Moreover, each inverter phase can be controlled independently using pulse width modulation, resulting in converter waveforms having low harmonic distortion.

In practice, however, using the hereinabove described control method, the resonant output voltage may fall short of the opposite rail voltage due to component resistances, device conduction losses and inadequate forcing potential. As a result, the next switching device in the inverter pole to be turned on may be switched at the peak of the resonating voltage, and hence must absorb some switching losses due to the non-zero voltage turn-on, including the energy dump from the parallel capacitor. Hence, although the resonant snubber circuit topology exhibits reduced main device stresses during switching instants and substantially reduced switching losses, it is desirable to reduce switching losses and associated EMI noise even further and thus more closely approach truly "lossless" switching.

OBJECTS OF THE INVENTION

Accordingly, an object of the present invention is to provide a new and improved method for controlling a power converter by using and suitably controlling an auxiliary resonant commutation circuit in order to achieve soft-switching of all switching devices employed in the power converter.

Another object of the present invention is to provide a method for controlling a power converter employing an auxiliary resonant commutation circuit in order to achieve soft-switching of all of the converter's switching devices such that high quality ac line current waveforms are attainable even with a reduced filter size and at high switching frequencies.

Still another object of the present invention is to provide a method for controlling a power converter employing an auxiliary resonant commutation circuit whereby the gating and conduction times of the converter's switching devices are controlled in such manner as to generate a boost energy which is added to the resonant operation in order to ensure soft-switching of all the switching devices.

SUMMARY OF THE INVENTION

The foregoing and other objects of the present invention are achieved in a new method for controlling a power converter and an associated auxiliary resonant commutation circuit to achieve soft-switching of all active devices employed therein. Such a power converter includes an inverter with two main switching devices per phase, each switching device having a diode connected in antiparallel therewith and further having a relatively large snubber capacitor coupled thereacross. The auxiliary resonant commutation circuit includes auxiliary switching devices coupled in series with an inductor and the snubber capacitors. Advantageously, the control method of the present invention controls the gating and conduction times of the inverter's switching devices, in addition to those of the auxiliary switching devices, to ensure that the output voltage attempts to overshoot, i.e. at least reaches, the positive and negative converter rail voltages during each resonant commutation cycle, thereby approaching true soft-switching of all the main devices.

In operation, the auxiliary resonant commutation circuit is triggered into conduction by a respective auxiliary switching device, thereby coupling the LC resonant circuit to a forcing potential substantially equal to one-half the dc supply voltage. With this forcing potential, the output resonating voltage should ideally have a peak-to-peak excursion equal to the dc supply voltage. In order to ensure that the resonating output voltage reaches the ideal peak-to-peak voltage excursion, the control method of the present invention involves adding a boost current to the resonant current by appropriately controlling the conduction times of the auxiliary switching devices and the main switching devices. A predetermined boost current level adds sufficient energy to the resonant operation to ensure that the output voltage attempts to overshoot the respective converter rail voltages, hence forward biasing the corresponding antiparallel diode and clamping the output voltage to the respective rail voltage. During the clamping interval, the control commutates the corresponding switching device with substantially no switching losses.

BRIEF DESCRIPTION OF THE DRAWINGS

The features and advantages of the present invention will become apparent from the following detailed description of the invention when read with the accompanying drawings in which:

FIG. 3 graphically represents the resonant inductor current and the resonant output voltage corresponding to the commutation sequence of FIG. 2;

DETAILED DESCRIPTION OF THE INVENTION

Figure 1:
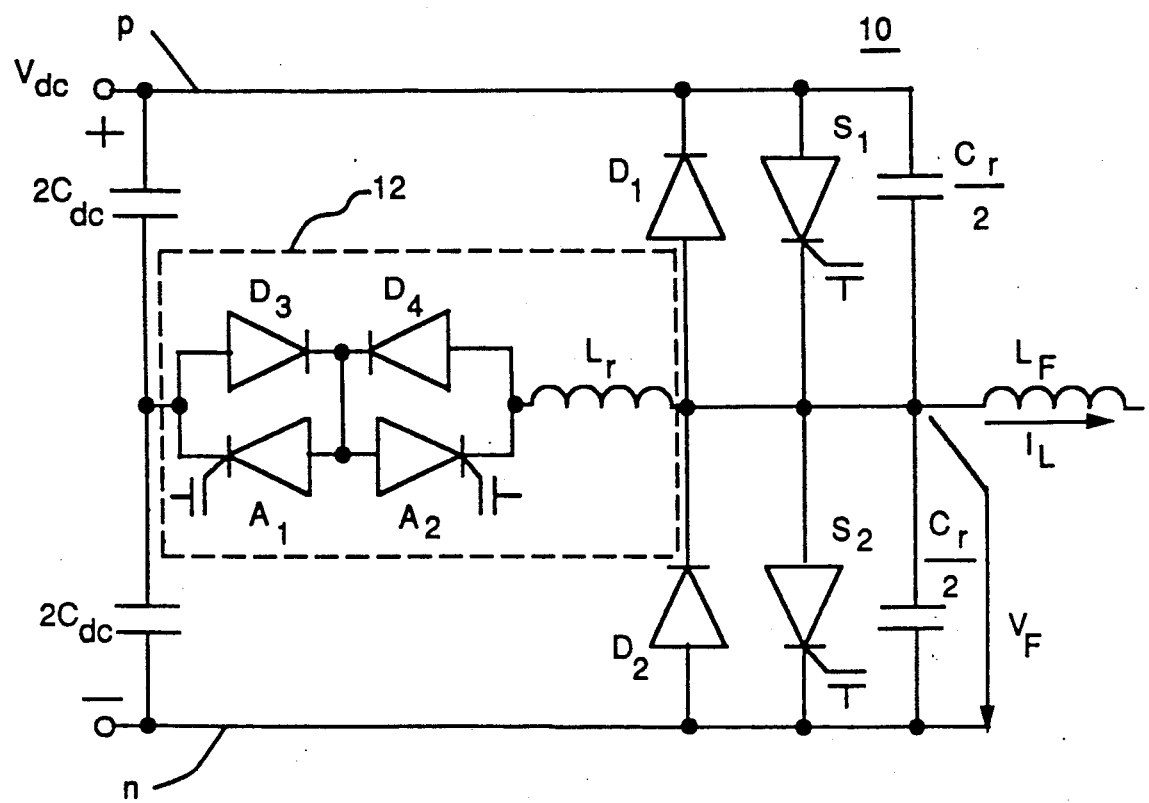
FIG. 1 is a schematic illustration of an inverter pole coupled to an auxiliary resonant commutation circuit useful in a power converter which may be controlled according to the method of the present invention.

FIG. 1 illustrates an inverter pole 10 and an associated auxiliary resonant commutation circuit 12 which may be advantageously controlled according to the method of the present invention in order to achieve soft-switching of all active devices therein, resulting in a highly efficient power converter. Although operation of only one inverter pole, or phase leg, is described and illustrated herein, it is to be understood that the control method of the present invention is applicable to power converters having any number of inverter phases. Multiphase full-bridge inverter configurations are well known in the art. An exemplary multiphase full-bridge inverter is described in Divan U.S. Pat. No. 4,730,242, issued Mar. 8, 1988, which patent is incorporated by reference herein. Furthermore, although the control method of the present invention is described with reference to a voltage-source inverter, the principles thereof are equally applicable to current-source inverters.

In FIG. 1, inverter pole 10 is shown as comprising two main switching devices $S_1$ and $S_2$ coupled in series across the positive and negative rails p and n, respectively, of the dc supply $V_{dc}$. Each switching device $S_1$ and $S_2$ has a diode $D_1$ and $D_2$, respectively, connected in antiparallel therewith, and further has a relatively large snubber capacitor $2/C_r$ connected thereacross. A load inductor LF is shown coupled to the junction between the snubber capacitors. Although switching devices $S_1$ and $S_2$ are illustrated as gate turn-off thyristors (GTO's), the control method of the present invention is applicable to power converters using other suitable self-turn-off switching devices, such as MOSFET's, bipolar junction transistors (BJT's), MOS-controlled thyristors (MCT's), or insulated gate n bipolar transistors (IGBT's). Auxiliary resonant commutation circuit 12 is coupled between the juncture of switching devices $S_1$ and $S_2$ and the juncture of a pair of substantially equivalent "bus-splitting" filter capacitors $2C_{dc}$, which capacitors are connected in series across the dc supply $V_{dc}$. Capacitors $2C_{dc}$ may comprise, for example, a center-tapped dc filter capacitor. Auxiliary resonant commutation circuit 12 includes two auxiliary switching devices $A_1$ and $A_2$ having their anodes coupled together. Each auxiliary switching device $A_1$ and $A_2$ has a diode $D_3$ and $D_4$, respectively, connected in antiparallel therewith. Auxiliary resonant commutation circuit 12 further includes a resonant inductor $L_r$ which is coupled in series with the total effective snubber Capacitance $C_r$ (i.e. Capacitors $2/C_r$ coupled in parallel) during the resonant commutation cycle, as described hereinbelow. Like main switching devices $S_1$ and $S_2$, auxiliary switching devices $A_1$ and $A_2$ are also shown in FIG. 1 as comprising GTO's, but other suitable auxiliary switching devices may comprise silicon controlled rectifiers (SCR's), zero-current turn-off thyristors (ZTO's), gate assisted turn-off thyristors (GATO's), or MOS-controlled thyristors (MCT's).

In accordance with the present invention, a control method is provided for determining the gating sequence and conduction times of main switching devices $S_1$ and $S_2$ and auxiliary switching devices $A_1$ and $A_2$ to achieve soft-switching thereof. In particular, the timing is controlled in such a manner as to provide a boost current $i_b$ (shown in FIG. 3) which, when added to the resonant inductor current $i_r$ (shown in FIG. 3), ensures that the resonant output voltage $V_F$ attempts to overshoot the $d_c$ rail voltages p and n during each resonant interval. As a result, the corresponding diode $D_1$ or $D_2$ is forward biased, clamping the resonant voltage $V_F$ to the respective rail p or n. This diode clamping interval provides a zero-voltage turn-on opportunity for the main switching devices $S_1$ and $S_2$ Furthermore, since the main switching devices turn off with a relatively large capacitance in parallel, there are substantially no main device turn-off switching losses, i.e. turn-off occurs with substantially zero voltage thereacross. Still further, the auxiliary switching devices exhibit substantially lossless switching. In particular, the auxiliary switching devices turn on with substantially zero current therethrough due to the presence of a relatively large inductor coupled in series therewith; and the auxiliary switching devices turn off when the resonant current reaches zero, i.e. with substantially zero current therethrough. Hence, soft-switching of all active devices employed in the power converter is achieved by the control method of the present invention.

Figure 2A:
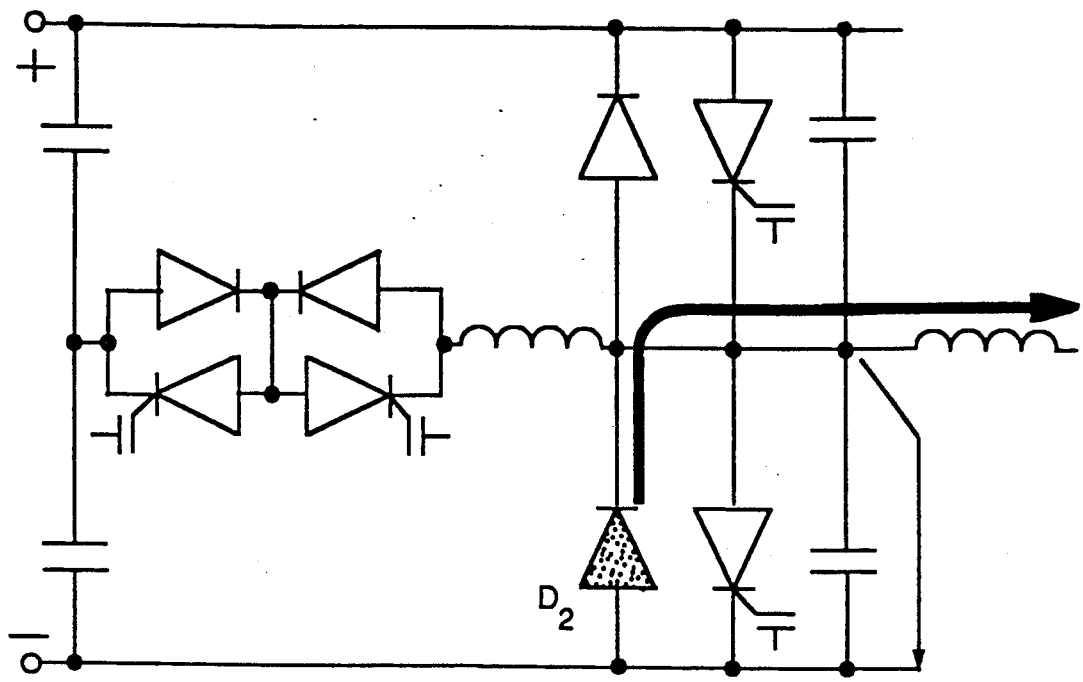
FIGS. 2a–2g schematically illustrate the sequence and directions of current flow in the circuit of FIG. 1 when commutation is initiated with current flowing in the antiparallel diode of one of the main inverter switching devices in accordance with the control method of the present invention.
Figure 2B:
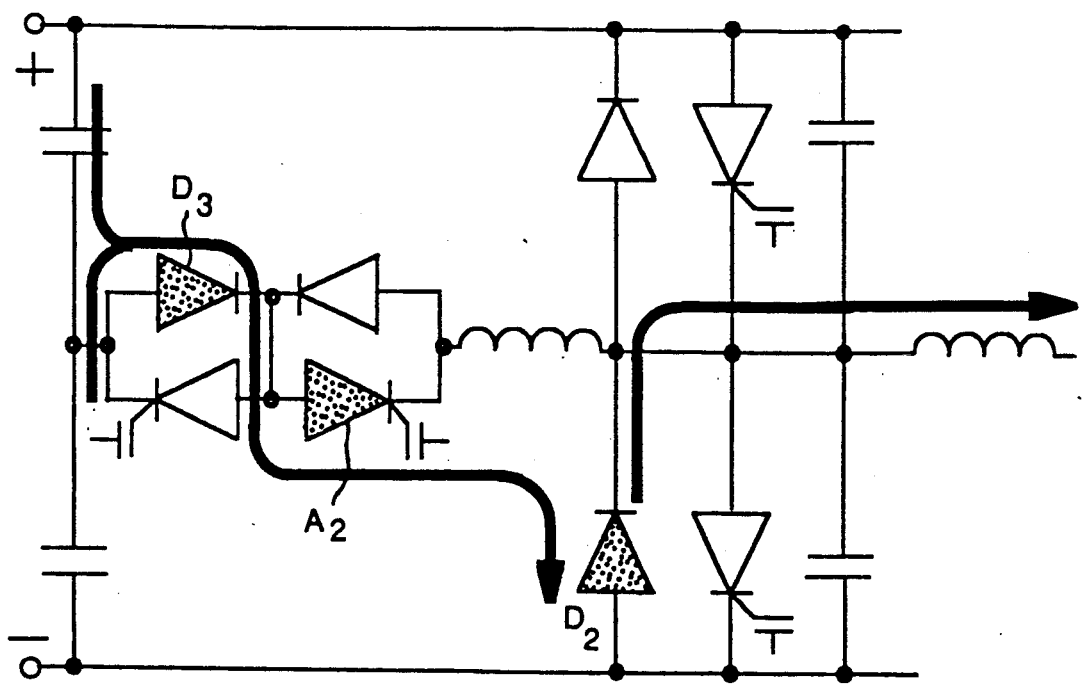

FIGS. 2a–2g schematically illustrate the sequence and directions of current flow in the circuit of FIG. 1 when commutation is initiated with current flowing in antiparallel diode $D_2$ in accordance with the control method of the present invention. In FIGS. 2a–2g (and in FIGS. 4a–4e and FIGS. 6a–6c described hereinbelow), the arrows indicate the directions of current flow, and the conducting devices are indicated by stippling. In conjunction therewith, FIG. 3 graphically illustrates the resonant and load currents $i_r$ and $I_L$, respectively, and the resonant output voltage $V_F$. Also in FIG. 3 (and in FIGS. 5 and 7 described hereinbelow), the time intervals during which the respective circuit devices are active are indicated by dashed vertical lines. The positive direction of the load current $I_L$ is defined in FIG. 1, and it will be assumed to be a constant current source during any commutation interval. With diode $D_2$ conducting current as indicated in FIG. 2a, the commutation process begins by turning on auxiliary switching device $A_2$ (FIG. 2b). As a result, a forcing potential equal to one-half the dc supply $2/V_{dc}$ is applied across resonant inductor $L_r$. This initiates a ramp-up commutation phase wherein the resonant current $i_r$ increases at a linear rate of $2L_r/V_{dc}$, as shown in FIG. 3. During the ramp-up commutation phase, main switching device $S_2$ remains gated on, even though it is not conducting current. As the resonant current $i_r$ increases, it displaces the load current initially flowing in diode $D_2$.

Figure 2C:
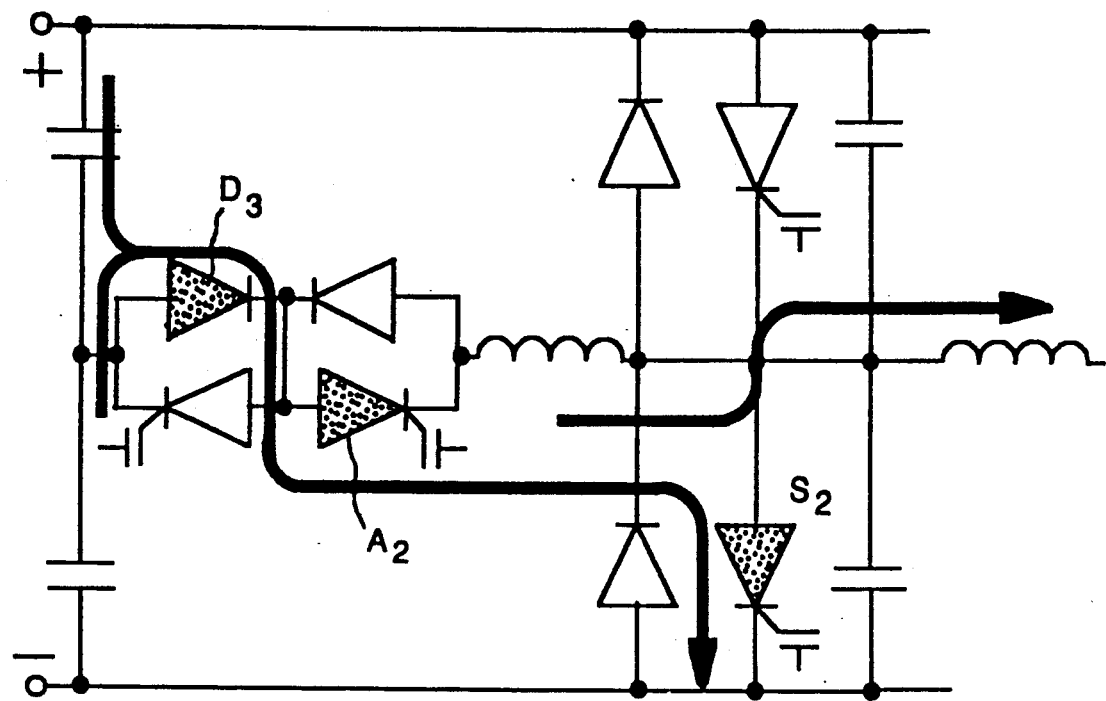

When the resonant current $i_r$ exceeds the load current level $I_L$, the boost phase of the commutation cycle begins (FIG. 2c). In the boost phase, the current in diode $D_2$ decreases to zero, and a boost current ib flows in main switching device $S_2$, with the boost current ib being determined by the expression $i_b = i_r - I_L$. In accordance with the present invention, the boost current $i_b$ adds sufficient energy to the resonant cycle to ensure that the resonant voltage $V_F$ attempts to overshoot the positive rail voltage $V_{dc}$. The energy E added by generation of the boost current ib is represented by the following expression:

$$E = \tfrac{1}{2} L_r i_b^2$$

The boost current ib increases in main switching device $S_2$ at a linear rate; hence, the duration of the boost phase can be controlled using a simple time delay.

Figure 2D:
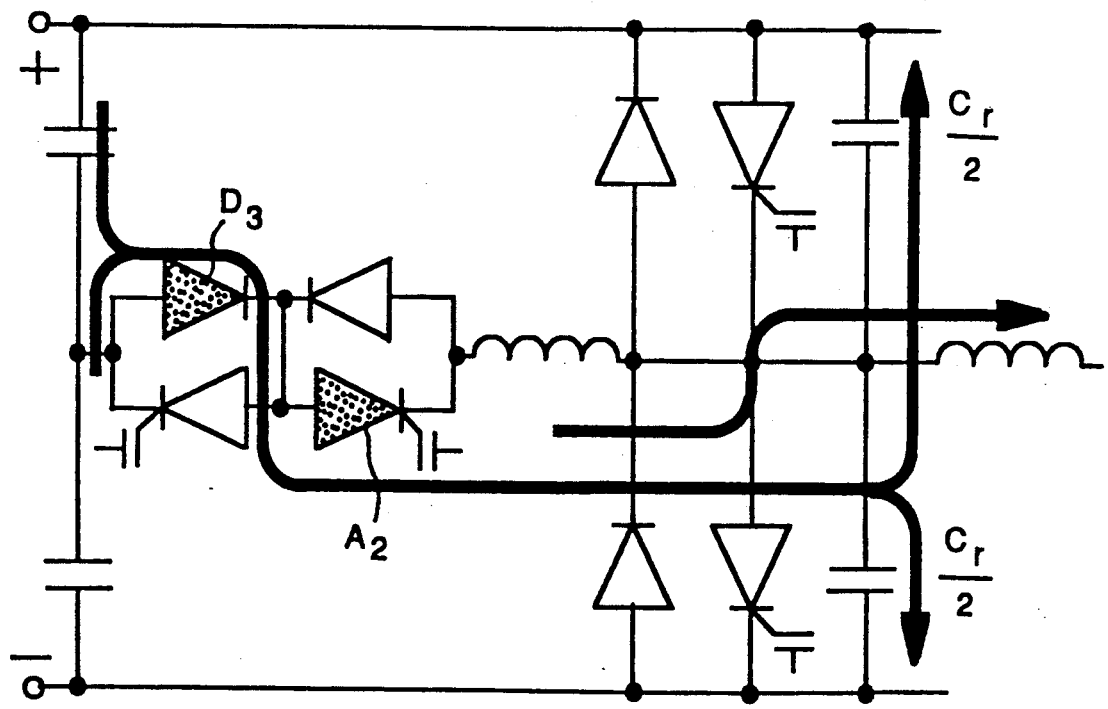

After a predetermined time delay, when the boost current $i_b$ reaches a specified boost current level $I_B$, main switching device $S_2$ is gated off to begin the resonant commutation phase (FIG. 2d). At this point, the resonant output voltage $V_F$ is released from the negative rail voltage level n and begins to swing toward the positive rail voltage level p as the current in main switching device $S_2$ is diverted to the snubber capacitors $2/C_r$ as the device is turned off As shown in FIG. 3, the resonant current $i_r$ comprises a sinusoidal half-cycle of current superimposed upon a dc load current level $I_L + I_B$. The peak current $I_p$ in auxiliary switching device $A_2$ is given by:

$$I_p = I_L + I_B + \frac{V_{dc}}{2\sqrt{\dfrac{L_r}{C_r}}}$$

Figure 2E:
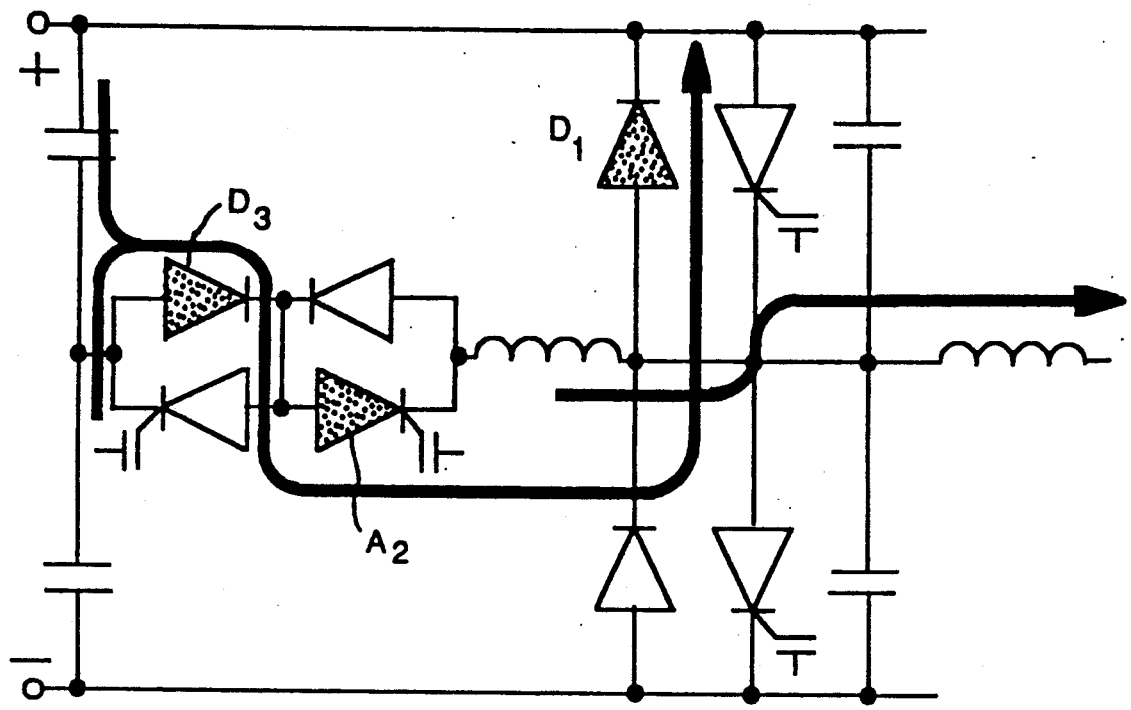

When the resonant output voltage $V_F$ attempts to overshoot the positive dc rail voltage p, the clamp commutation phase begins wherein diode $D_1$ becomes forward biased, thus clamping the output resonant voltage $V_F$ to the positive rail voltage p (FIG. 2e). At this point, main switching device $S_1$ is gated on with substantially zero switching losses, i.e. with zero voltage thereacross (FIG. 3). Furthermore, during the clamp commutation phase, any excess boost energy remaining in the resonant inductor $L_r$ is diverted to the dc filter capacitors $C_{dc}$ as the resonant current $i_r$ linearly decreases, forced by the potential $2/V_{dc}$.

Figure 2F:
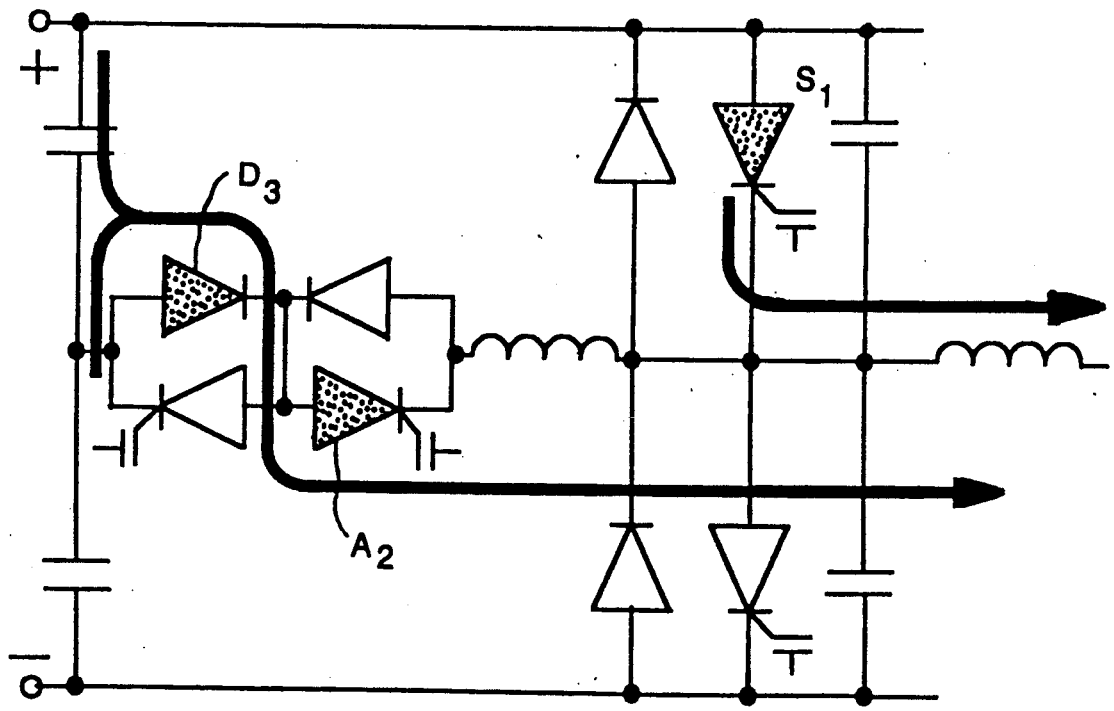
Figure 2G:
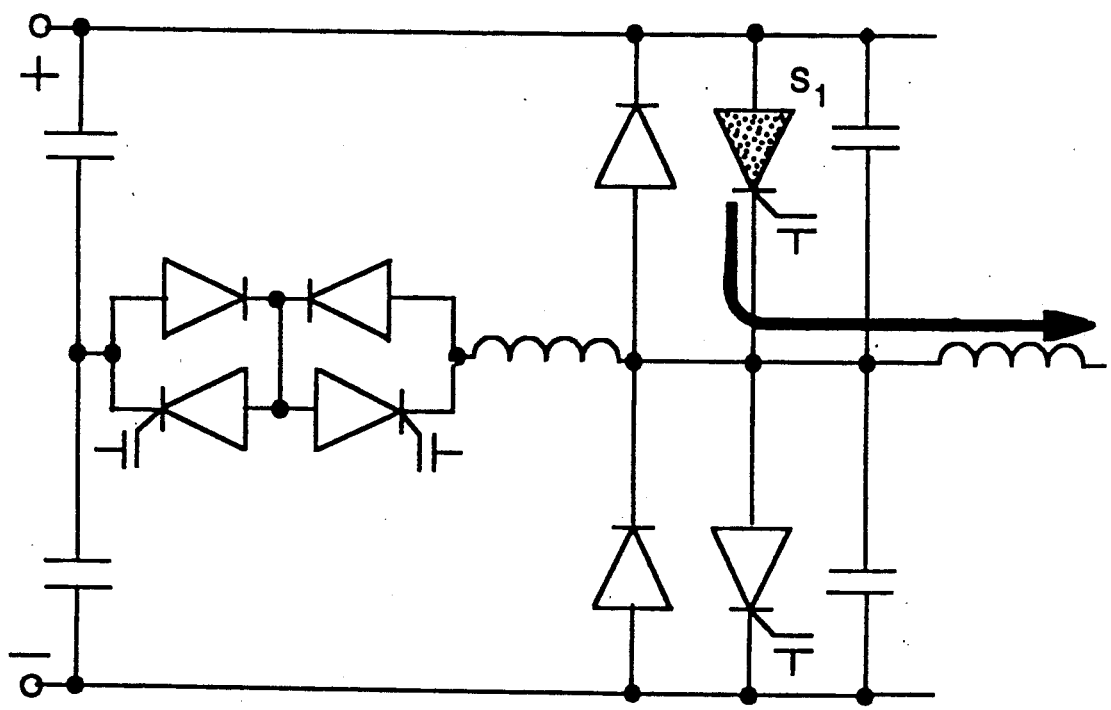

When the resonant current $i_r$ decreases below the load current level $I_L$, the ramp-down commutation phase begins wherein the resonant current $i_r$ continues to decrease at a linear rate of $2/-V_{dc}$ (FIG. 2f). As the resonant current $i_r$ decreases, the current in switching device $S_1$ increases to the load current level $I_L$. The commutation sequence ends when the resonant current $i_r$ reaches zero, at which time auxiliary switching device $A_2$ is gated off (FIG. 2g). (Practically, auxiliary switching device $A_2$ should be gated off slightly before the resonant current $i_r$ reaches zero in order to minimize reverse recovery losses.) The total duration $t_c$ of the commutation sequence may be estimated using the following equation:

$$t_c = 2L_r \frac{(2I_L + I_B)}{V_{dc}} + \pi \sqrt{L_r C_r}$$

Advantageously, for high load currents, the main diodes $D_1$ and $D_2$ may assist the commutation process with their reverse recovery current. In particular, the reverse recovery current flows in the same direction as the boost current and, therefore, adds energy to the resonant inductor. The amplitude of the reverse recovery current depends on the characteristics of the diode and on the diode current amplitude prior to turn-off. Hence, in an alternative embodiment, the controller establishes a diode boost threshold current above which the antiparallel main switching device is not gated on during the boost phase. Consequently, above this diode boost threshold current, the diodes are employed as active devices, thereby reducing the turn-off switching losses in the main devices $S_1$ and $S_2$. This alternative control method may be advantageously employed in power converters which utilize high power devices with low gate impedances, such as GTO's and BJT's. Proper selection of the diodes is required to minimize the diode losses during the reverse recovery period. Diodes having relatively large recovery charges, but with relatively short recovery times, are preferred.

Figure 4A:
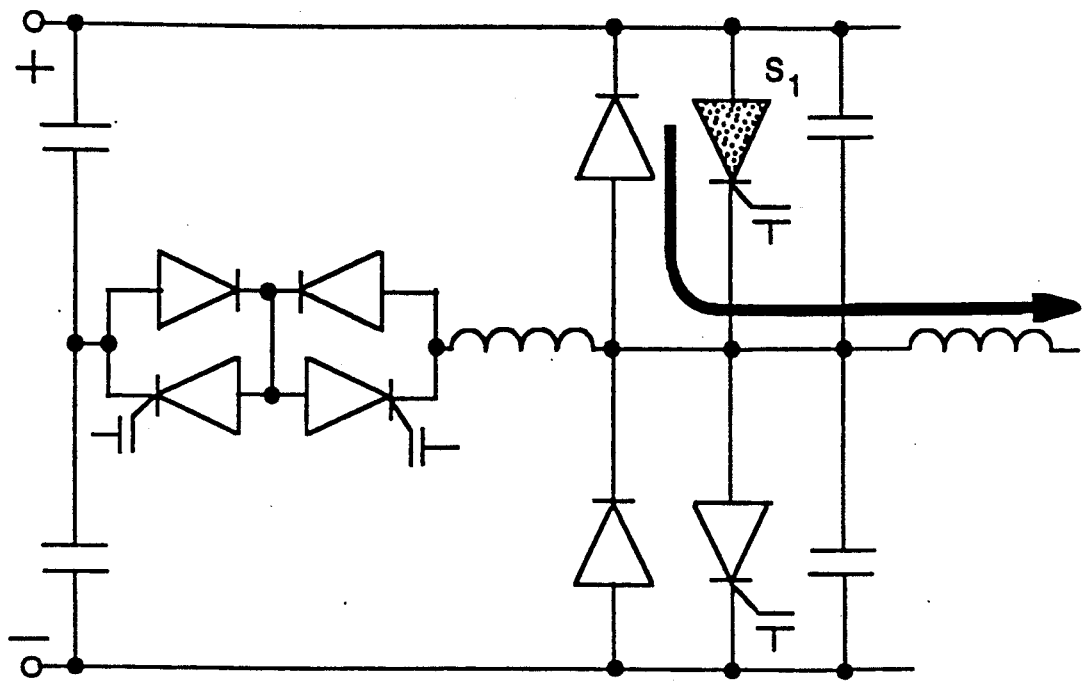
FIGS. 4a–4e schematically illustrate the sequence and directions of current flow in the circuit of FIG. 1 when commutation is initiated with relatively low current flowing in one of the main inverter switching devices in accordance with the control method of the present invention.
Figure 4B:
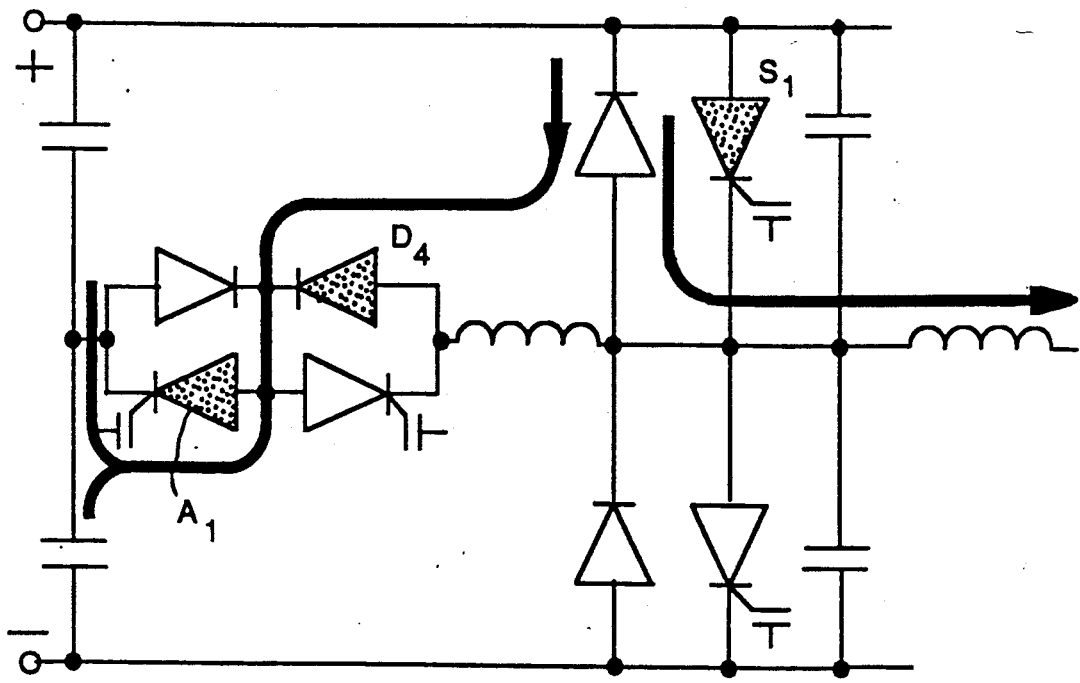

FIGS. 4a–4e schematically illustrate the sequence and directions of current flow in the circuit of FIG. 1 when commutation is initiated with relatively low current flowing in main switching device $S_1$ in accordance with the control method of the present invention. In conjunction therewith, FIG. 5 graphically illustrates the resonant current $i_r$ and the resonant output voltage $V_F$. To start the commutation process, auxiliary switching device $A_1$ is gated on (FIG. 4b). As a result, a forcing potential of one-half the dc supply $2/V_{dc}$ is applied across resonant inductor $L_r$. This initiates the boost phase wherein the resonant current $i_r$ decreases at a linear rate of $2L_r/-V_{dc}$ (FIG. 5). During the boost phase, the boost current $i_b$ and the load current $I_L$ flow through main switching device $S_1$.

Figure 4C:
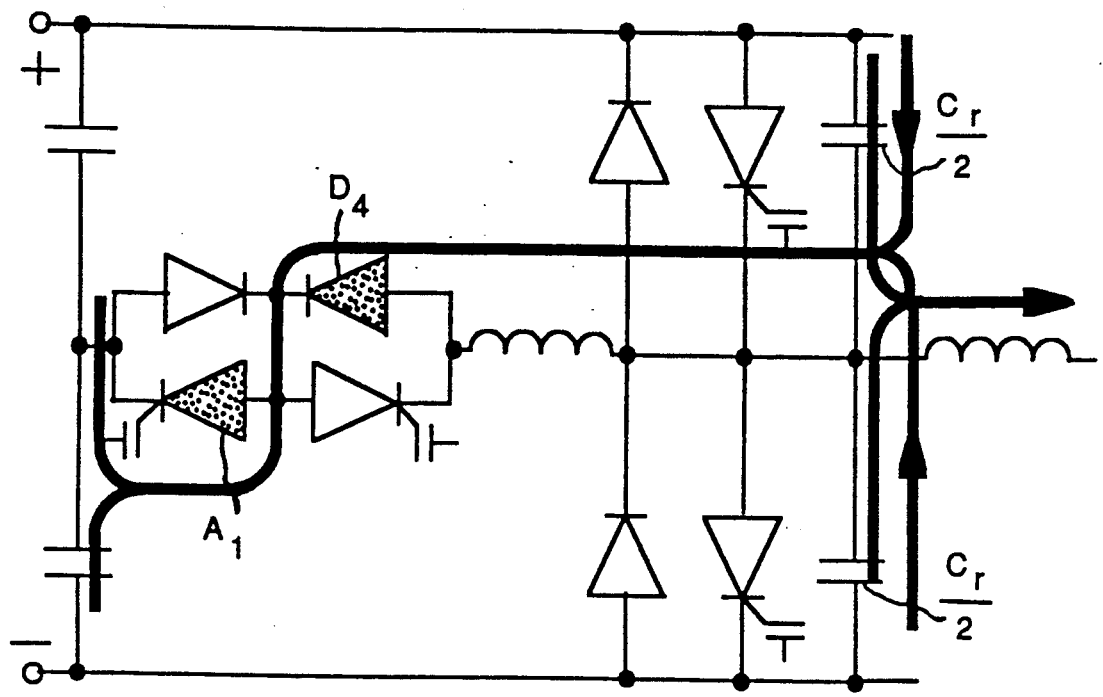
Figure 4D:
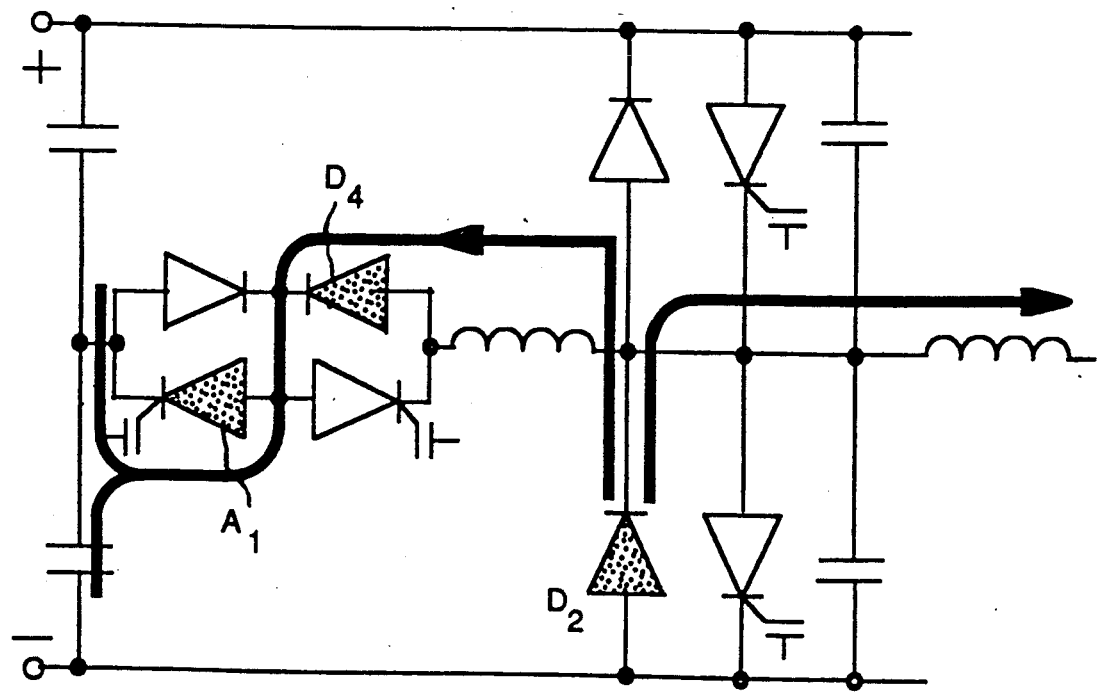
Figure 4E:
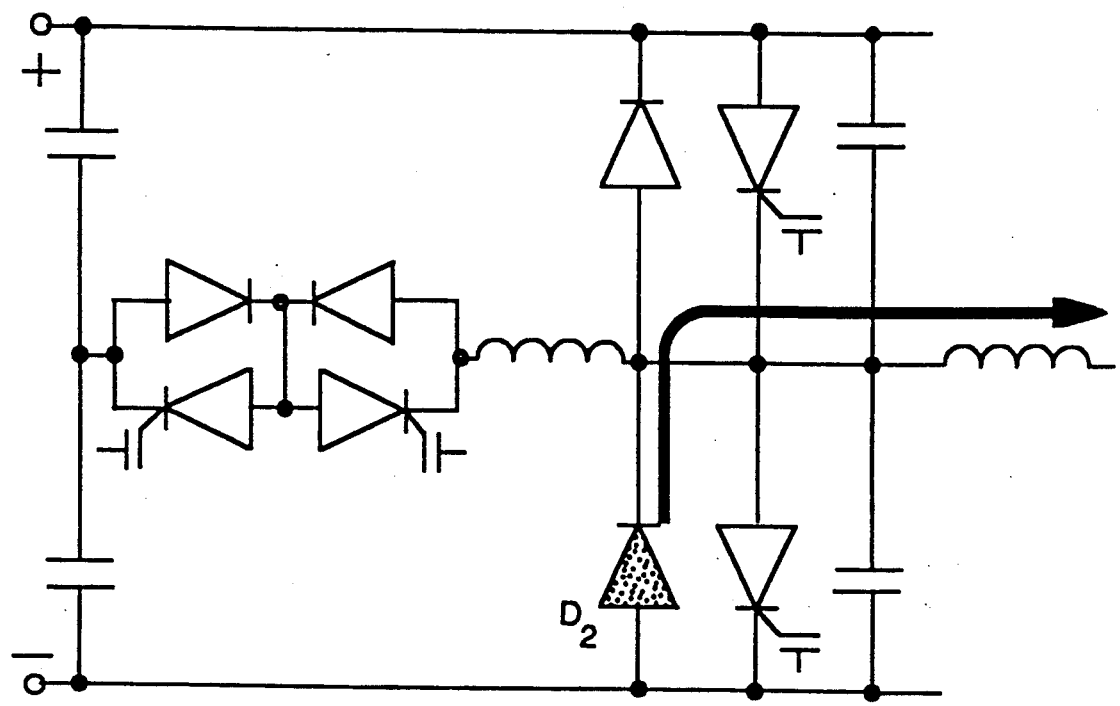
Figure 5:
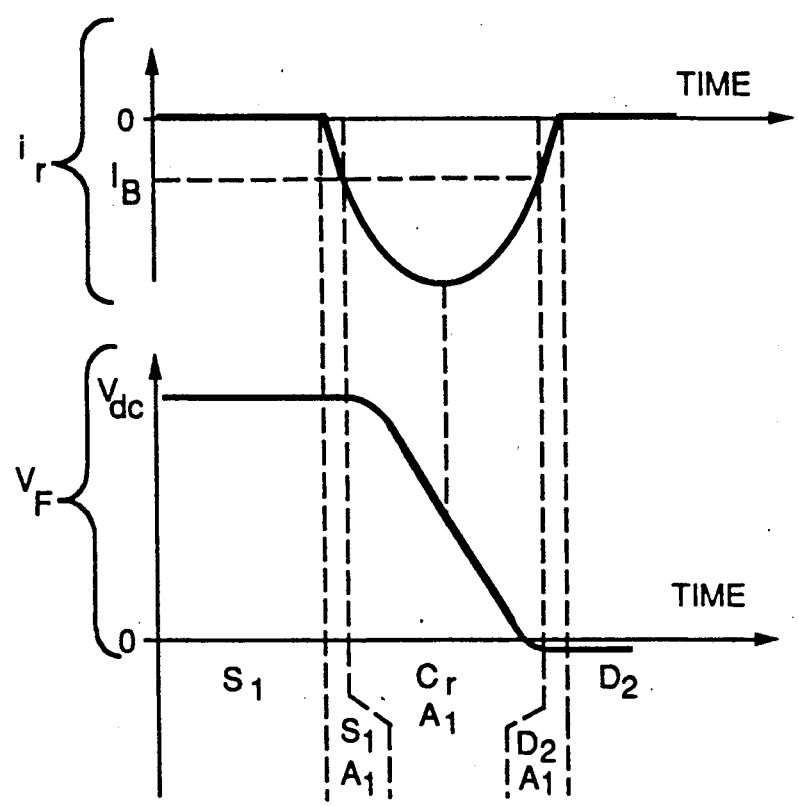
FIG. 5 graphically represents the resonant inductor current and the resonant output voltage corresponding to the commutation sequence of FIG. 4.

When the boost current $i_b$ reaches the specified level $I_B$, main switching device $S_1$ is gated off to begin the resonant commutation phase (FIGS. 4c and 5). At this point, the output voltage $V_F$ is released from the positive rail voltage level p to swing toward the negative rail voltage level n, while the current in main switching device $S_1$ at turn-off diverts to the snubber capacitors $2/C_r$. During the resonant commutation phase, the resonant current $i_r$ comprises a half-cycle of sinusoidal current superimposed upon the boost current level Is (FIG. 5). The current in snubber capacitors $2/C_r$ is given by the sum of the resonant current and the load current, i.e. $i_s = i_r + I_L$. Consequently, the Output voltage $V_F$ varies with the sum of sinusoidal and ramp waveforms. When the output voltage $V_F$ attempts to overshoot the negative dc rail voltage level n, the clamp commutation phase begins (FIG. 4d). At this time, main switching device $S_2$ is gated on with no switching losses. The excess boost energy remaining in the resonant inductor $L_r$ is returned to the dc filter capacitors $C_{dc}$ as the resonant current $i_r$ linearly decreases, forced by the potential $V_{dc}$ across the inductor. The commutation sequence ends when the resonant current $i_r$ reaches zero and auxiliary switching device $A_1$ is gated off (FIG. 4e). At this point, diode $D_2$ is conducting all of the load current $I_L$.

Figure 6A:
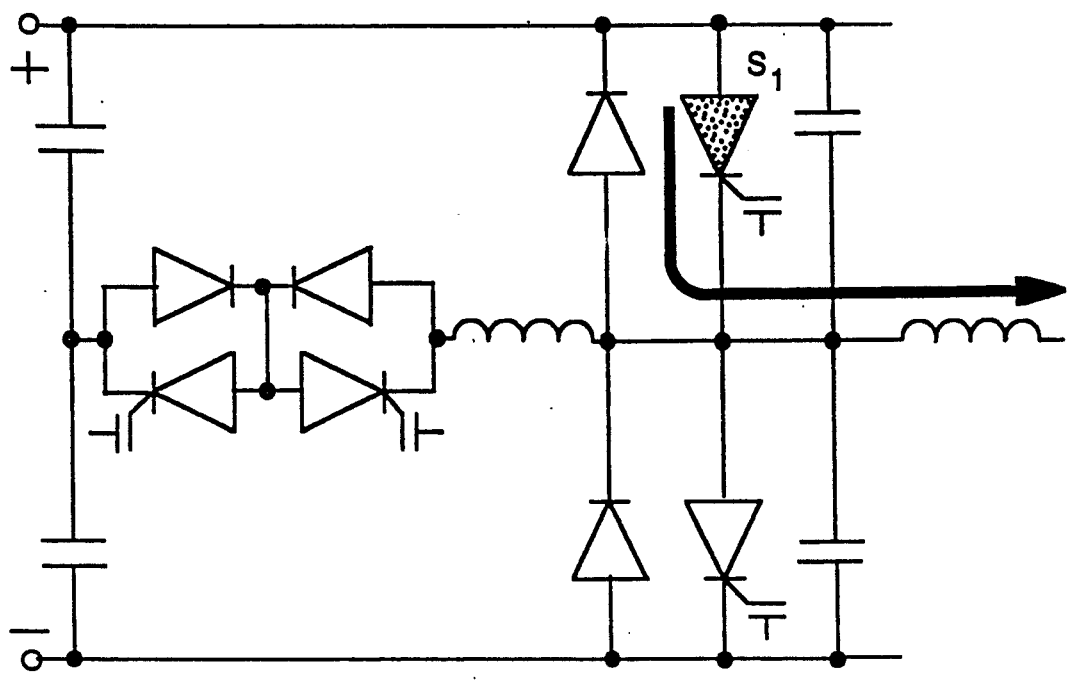
FIGS. 6a–6c schematically illustrate the sequence and directions of current flow in the circuit of FIG. 1 when commutation is initiated with relatively high current flowing in one of the main inverter switching devices in accordance with the control method of the present invention.
Figure 6B:
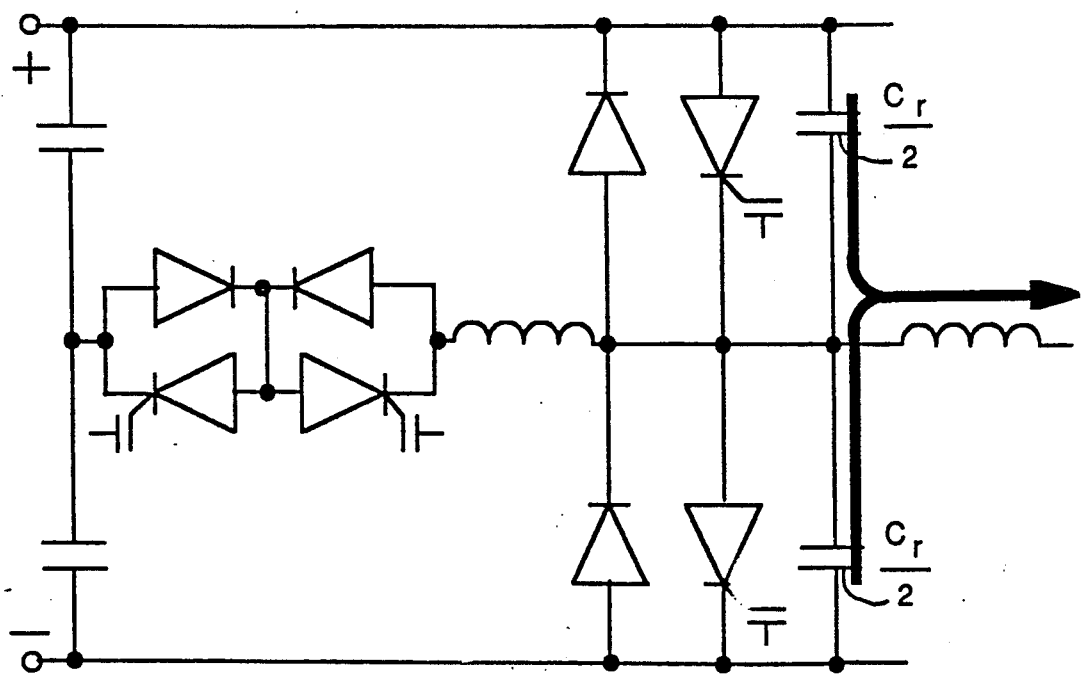
Figure 6C:
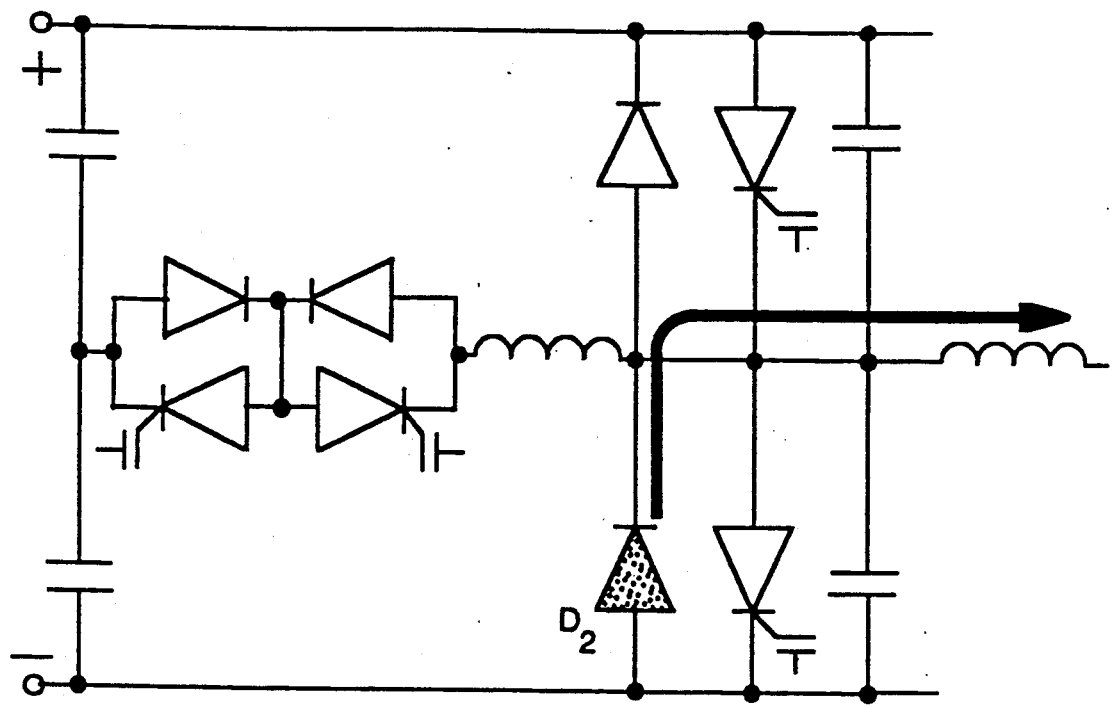
Figure 7:
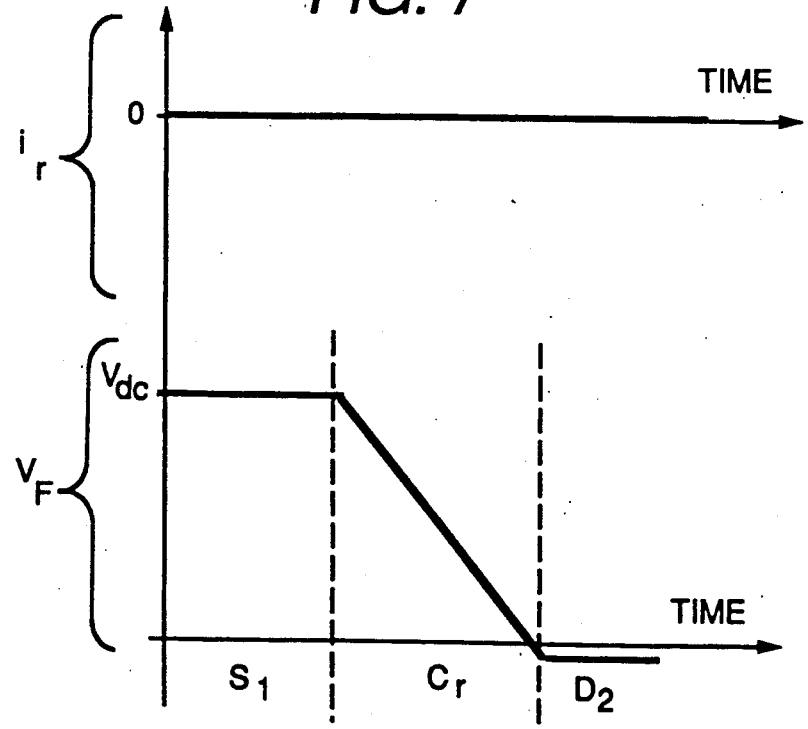
FIG. 7 graphically represents the resonant inductor current and the resonant output voltage corresponding to the commutation sequence of FIG. 6.

FIGS. 6a–6c schematically illustrate the sequence and directions of current flow in the circuit of FIG. 1 when commutation is initiated with relatively high current flowing in main switching device $S_1$ in accordance with the control method of the present invention. In conjunction therewith, FIG. 7 graphically illustrates the resonant current $i_r$ and the resonant output voltage $V_F$. If commutation of inverter pole 10 is to be initiated while current flowing in main switching device $S_1$ is sufficiently high, i.e. exceeds a predetermined threshold level $I_T$, the control does not employ the auxiliary commutation circuit 12. In particular, auxiliary switching device $A_1$ is not gated on to start the commutation process as described hereinabove with respect to the relatively low current case. Instead, the control immediately turns off main switching device $S_1$, snubber capacitors $2/C_r$ (FIG. 6b). As a result, the output voltage $V_F$ decreases linearly at a rate proportional to the load current magnitude (FIG. 7). When the output voltage $V_F$ falls below the negative dc rail voltage level n, diode $D_2$ becomes forward biased and the load current is immediately transferred thereto, thus ending the commutation process (FIG. 6c). The current threshold $I_T$ above which the auxiliary commutation circuit is not needed to boost energy into the resonant operation of the converter is given by the following expression:

$$I_T = \frac{C_r V_{dc}}{t_{max}},$$

where $t_{max}$ represents the maximum commutation time, i.e. the time required for completing the commutation process when it is initiated with full load current flowing in the antiparallel diode coupled across one of the main switching devices (FIGS. 4 and 5). Preferably, the current threshold $I_T$ is selected to be sufficiently less than the peak load current such that the sum $I_T + I_s$ does not exceed the peak load current value. In this way, the addition of the boost current does not result in a device current rating penalty.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a power converter of the type including an inverter having at least one phase, said inverter having at least two series-coupled main switching devices per phase, said series-coupled main switching devices being coupled to positive and negative rails of a dc supply, the junction between said main switching devices being coupled to a load, said main switching devices each having a snubber capacitor coupled in parallel therewith and an antiparallel diode coupled thereacross, said power converter further including a pair of series-coupled bus-splitting capacitors coupled between said positive and negative rails of said dc supply, said power converter further including an auxiliary resonant commutation circuit coupled between the junction joining said main switching devices and the junction joining said bus-splitting capacitors, said auxiliary resonant commutation circuit comprising a pair of antiparallel-coupled auxiliary switching devices coupled in series with a resonant circuit, said resonant circuit including an inductor and said snubber capacitors, said method comprising commutating load current between one of said main switching devices and the opposing one of said antiparallel diodes coupled across the other one of said main switching devices, when commutation is initiated with load current in said opposing one of said antiparallel diodes, by:

(a) applying a forcing potential of substantially one-half the dc supply voltage across said inductor by turning on one of said auxiliary switching devices;

(b) allowing current in said inductor to increase to the load current level and displace the load current flowing through said opposing one of said antiparallel diodes;

(c) turning on said other one of said main switching devices so as to enable the current through said inductor to increase to a predetermined boost current threshold above the load current level;

(d) turning off said other one of said main switching devices when current therethrough reaches said predetermined boost current threshold, thereby allowing said resonant circuit to resonate from the voltage level of one of said rails of said dc supply to the voltage level of the opposite rail thereof;

(e) clamping the output voltage of the respective inverter phase to the voltage level of the opposite rail of said dc supply by forward biasing the other one of said antiparallel diodes;

(f) turning on said one of said main switching devices when the voltage thereacross is substantially zero;

(g) allowing the current through said inductor to decrease to substantially zero; and ((h) turning off said one of said auxiliary switching devices when the current therethrough is substantially zero;

whereby the load current flows through said one of said main switching devices.

2. A method for controlling a power converter of the type including an inverter having at least one phase, said inverter having at least two series-coupled main switching devices per phase, said series-coupled main switching devices being coupled to positive and negative rails of a dc supply, the junction between said main switching devices being coupled to a load, said main switching devices each having a snubber capacitor coupled in parallel therewith and an antiparallel diode coupled thereacross, said power converter further including a pair of series-coupled bus-splitting capacitors coupled between said positive and negative rails of said dc supply, said power converter further including an auxiliary resonant commutation circuit coupled between the junction joining said main switching devices and the junction joining said bus-splitting capacitors, said auxiliary resonant commutation circuit comprising a pair of antiparallel-coupled auxiliary switching devices coupled in series with a resonant circuit, said resonant circuit including an inductor and said snubber capacitors, said method comprising commutating load current between one of said main switching devices and the opposing one of said antiparallel diodes coupled across the other one of said main switching devices, when commutation is initiated with load current in said one of said main switching devices, when the load current is less than a high current threshold, by:

(a) applying a forcing potential of substantially one-half the dc supply voltage across said inductor by turning on one of said auxiliary switching devices;

(b) allowing current in said inductor to increase to a predetermined boost current threshold;

(c) turning off said one of said main switching devices when current therethrough reaches said predetermined boost current threshold above the load current level, thereby allowing said resonant circuit to resonate from the voltage level of one of said rails of said dc supply to the voltage level of the opposite rail thereof;

(d) clamping the output voltage of the respective inverter phase to the voltage level of the opposite rail of said dc supply by forward biasing said opposing one of said antiparallel diodes;

(e) allowing the current in said inductor to decrease to substantially zero; and (f) turning off said one of said auxiliary switching devices when the current therethrough is substantially zero;

whereby the load current flows through said opposing one of said antiparallel diodes.

3. The method of claim 2 wherein said high current threshold is determined according to the following expression:

$$I_T \leq \frac{C_r V_{dc}}{t_{max}},$$

wherein $I_T$ represents said high current threshold, $C_r$ represents the effective capacitance of the parallel combination of said snubber capacitors, $V_{dc}$ represents the dc supply voltage, and $t_{max}$ represents the maximum time for commutation of each respective one of said main switching devices.

4. The method of claim 2 wherein said high current threshold is sufficiently less than the peak output current from said inverter such that the sum of said high current threshold and said predetermined boost threshold current does not exceed said peak output current.

5. A method for controlling a power converter of the type including an inverter having at least one phase, said inverter having at least two series-coupled main switching devices per phase, said series-coupled main switching devices being coupled to positive and negative rails of a dc supply, the junction between said main switching devices being coupled to a load, said main switching devices each having a snubber capacitor coupled in parallel therewith and an antiparallel diode coupled thereacross, said power converter further including a pair of series-coupled bus-splitting capacitors coupled between said positive and negative rails of said dc supply, said power converter further including an auxiliary resonant commutation circuit coupled between the junction joining said main switching devices and the junction joining said bus-splitting capacitors, said auxiliary resonant commutation circuit comprising a pair of antiparallel-coupled auxiliary switching devices coupled in series with a resonant circuit, said resonant circuit including an inductor and said snubber capacitors, said method comprising commutating load current between one of said main switching devices and the opposing one of said antiparallel diodes coupled across the other one of said main switching devices, when commutation is initiated with load current in said one of said main switching devices, when the load current is greater than a high current threshold, by:

(a) turning off said one of said main switching devices;

(b) allowing the load current to drive the output voltage of the respective inverter phase from the voltage level of one of said rails of said dc supply to the voltage level of the opposite rail thereof;

(c) clamping the output voltage of the respective phase of said inverter to the voltage level of the opposite rail of said dc supply by forward biasing said opposing one of said antiparallel diodes;

whereby the load current flows through said opposing one of said antiparallel diodes.

6. The method of claim 5 wherein said high current threshold is determined according to the following expression:

$$I_T \leq \frac{C_r V_{dc}}{t_{max}},$$

wherein $I_T$ represents said high current threshold, $C_r$ represents the effective capacitance of the parallel combination of said snubber capacitors, $V_{dc}$ represents the dc supply voltage, and $t_{max}$ represents the maximum time for commutation of each respective one of said main switching devices.

7. The method of claim 5 wherein said high current threshold is sufficiently less than the peak output current from said inverter such that the sum of said high current threshold and said predetermined boost threshold current does not exceed said peak output current.

8. A method for controlling a power converter of the type including an inverter having at least one phase, said inverter having at least two series-coupled main switching devices per phase, said series-coupled main switching devices being coupled to positive and negative rails of a dc supply, the junction between said main switching devices being coupled to a load, said main switching devices each having a snubber capacitor coupled in parallel therewith and an antiparallel diode coupled thereacross, said power converter further including a pair of series-coupled bus-splitting capacitors coupled between said positive and negative rails of said dc supply, said power converter further including an auxiliary resonant commutation circuit coupled between the junction joining said main switching devices and the junction joining said bus-splitting capacitors, said auxiliary resonant commutation circuit comprising a pair of antiparallel-coupled auxiliary switching devices coupled in series with a resonant circuit, said resonant circuit including an inductor and said snubber capacitors, said method comprising commutating load current between one of said main switching devices and the opposing one of said antiparallel diodes coupled across the other one of said main switching devices, when commutation is initiated with load current in said opposing one of said antiparallel diodes, when the load current is greater than a diode boost threshold, by:
(a) applying a forcing potential of substantially one-half the dc supply voltage across said inductor by turning on one of said auxiliary switching devices;
(b) allowing current in said inductor to increase to the load current level and displace the load current flowing through said opposing one of said antiparallel diodes;
(c) allowing said resonant circuit to resonate from the voltage level of one of said rails of said dc supply to the voltage level of the opposite rail thereof;
(d) clamping the output voltage of the respective inverter phase to the voltage level of the opposite rail of said dc supply by forward biasing the other one of said antiparallel diodes;
(e) turning on said one of said main switching devices when the voltage thereacross is substantially zero;
(f) allowing current in said inductor to decrease to substantially zero; and
(g) turning off said one of said auxiliary switching devices when the current therethrough is substantially zero;
whereby the load current flows through said one of said main switching devices.

* * * * *